(12) United States Patent
Cirrincione et al.

(10) Patent No.: US 8,594,481 B2
(45) Date of Patent: Nov. 26, 2013

(54) MANAGING SYNCHRONIZATION OF MEDIA PROGRAMS TO PORTABLE DEVICES

(75) Inventors: Cory Jon Cirrincione, Redmond, WA (US); Joseph McClanahan, Redmond, WA (US); Mark Schwesinger, Bellevue, WA (US); Jeffrey Christopher Abraham, Seattle, WA (US); Chad Wesley Wahlin, Issaquah, WA (US); Luke Wabaunsee McCullough, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1098 days.

(21) Appl. No.: 12/056,223

(22) Filed: Mar. 26, 2008

(65) Prior Publication Data
US 2009/0245756 A1 Oct. 1, 2009

(51) Int. Cl.
*H04N 5/765* (2006.01)
*H04N 5/932* (2006.01)
*H04N 9/80* (2006.01)

(52) U.S. Cl.
USPC ............. 386/83; 386/200; 386/201; 386/248; 386/262

(58) Field of Classification Search
USPC ............................ 386/83, 200–201, 248, 262
See application file for complete search history.

(56) References Cited

U.S. PATENT DOCUMENTS

| | | | |
|---|---|---|---|
| 6,937,168 B2 | 8/2005 | Rao et al. | |
| 7,114,172 B2 | 9/2006 | Lord | |
| 7,200,611 B2 | 4/2007 | Potrebic et al. | |
| 7,689,510 B2 * | 3/2010 | Lamkin et al. | 705/51 |
| 2003/0172383 A1 | 9/2003 | Takagi et al. | |
| 2004/0223737 A1 * | 11/2004 | Johnson | 386/68 |
| 2005/0246451 A1 | 11/2005 | Silverman et al. | |
| 2006/0165375 A1 | 7/2006 | Choi et al. | |
| 2006/0224620 A1 | 10/2006 | Silverman et al. | |
| 2007/0061490 A1 | 3/2007 | Sullivan et al. | |
| 2007/0079344 A1 * | 4/2007 | Song | 725/100 |
| 2008/0201225 A1 * | 8/2008 | Maharajh et al. | 705/14 |

FOREIGN PATENT DOCUMENTS

WO 2005125202 A2 12/2005

OTHER PUBLICATIONS

Barb Bowman, Viewing Recorded TV on a Windows Mobile-Based Portable Media Center, Apr. 12, 2004 http://www.microsoft.com/windowsxp/using/mobility/expert/bowman_pmc2.mspx.
"eVo Personal Video Recorder," SourceForge.net [online], [retrieved on Jan. 18, 2008], Retrieved from the Internet: <URL:http://wourceforge.net/projects/evopvr/>, 1 page.

(Continued)

*Primary Examiner* — Carl Colin
*Assistant Examiner* — John Elmore
(74) *Attorney, Agent, or Firm* — Vierra Magen Marcus LLP

(57) ABSTRACT

Techniques are disclosed herein for managing the transfer of digital media that is recorded on a source device (e.g., personal video recorder) to a target device (e.g., portable media player). In one aspect, a user interface is provided for scheduling recording of digital media content on a source device and for inputting user preferences for transferring digital media content to be recorded on the source device to a target device. A user request is received in the user interface to schedule recording of digital media on the source device. User preferences for transferring digital media from the source device to the target device are also received in the user interface. The digital media is recorded on the source device per the user's request. Synchronization of the recorded digital media from the source device to the target device is managed based on the user preferences.

20 Claims, 9 Drawing Sheets

(56) References Cited

OTHER PUBLICATIONS

"GB-PVR 1.1.5," SixFiles.com [online], [retrieved on Jan. 18, 2008], Retrieved from the Internet: <URL:http://www.sixfiles.com/dbase/files/gb-pvr-mediacentre-gb-pvr.html>, 1 page.

"Sync to devices," Window Media [online] Questions and Answers, [retrieved on Jan. 18, 2008], Retrieved from the Internet: <URL:http://www.microsoft.com/windows/windowsmedia/player/faq/sync.mspx?pf=true>, 4 pages.

* cited by examiner

MANAGING SYNCHRONIZATION OF MEDIA PROGRAMS TO PORTABLE DEVICES

BACKGROUND

As digital media technology continues to advance and the cost of storage continues to decline, users increasingly record digital media on some form of personal digital recorder, which when used to record video may be referred to as a personal video recorder (PVR). A personal computer can implement the PVR, for example, consumers are increasingly recording television programs and broadcast movies on their personal computers. However, the PVR can be implemented with a device other than a personal computer. Further, instead of television programs and movies, the media to be recorded might include only audio, still pictures, etc.

In addition to the foregoing, consumer demand is increasing for portable media players, which can include devices dedicated to playing media, or multi-function devices such as personal digital assistants (PDAs), hand-held computers, and smart telephones. Because users desire to transfer their digital media from their personal computer to their portable media players there is a growing need for applications that effectively transfer digital media from source devices, such as personal computers, to target devices such as portable media players.

The portable media players typically have very limited storage in comparison to the PVR or personal computer. The portable media players also typically have slower processors and different screen sizes from the PVR. In order to adapt the digital media to be playable on the portable media player, the digital media typically needs to be altered by a process referred to as "transcoding." Transcoding may include converting the digital media from one format to another (e.g., MP3 to WMA) so the digital media will play on the playback device, down-sampling the digital media to a lower bit rate to reduce the amount of storage space needed on the playback device, adapting the screen size associated with the digital media so video appears correctly on the playback device, etc. The transcoding process is typically performed on the personal computer (or PVR). However, it can still take a substantial amount of time to transcode hours of video. Thus, transcoding takes up valuable processing time on the personal computer. More significantly, if the digital media is not already transcoded when the user synchronizes the portable media player to the personal computer, the user's time is wasted.

Thus, the user may wish to play the digital media on more than one device. However, as the foregoing indicates, transferring the digital media to the portable media player presents problems.

SUMMARY

Techniques are disclosed herein for managing the transfer of digital media that is recorded on a personal computer or PVR to a portable media player. This transfer is also referred to herein as "synchronization." A system disclosed herein collects user preferences with respect to digital media (e.g., television programs) that is to be recorded on a PVR. The user preferences are used to manage the transfer of recorded digital media from the PVR to a portable media player and the removal of digital media from the portable media player to make room for the transferred digital media that the user would prefer to have on the portable media player. Moreover, digital media that is expected to be transferred from the PVR to the portable media player in the future is transcoded prior to when the portable media player is available for a synchronization. Furthermore, playing status that defines what portions of the digital media the user played on the portable media player is transferred to the PVR. An example of the playing status is a bookmark that allows the user to pick up playing the digital media on the PVR where the user left off on the portable media player. The foregoing techniques result in the digital media being managed over its "playing lifetime" on multiple devices.

In one aspect, a user interface is provided for scheduling recording of digital media content on a source device (e.g., PVR) and for inputting user preferences for transferring digital media content to be recorded on the source device to a target device (e.g., portable media player). A user request is received in the user interface to schedule recording of digital media on the source device. User preferences for transferring digital media from the source device to the target device are also received in the user interface. The digital media is recorded on the source device per the user's request. Synchronization of the recorded digital media from the source device to the target device is managed based on the user preferences.

In another aspect, user preferences for transferring media programs from a first device to a second device are received in a user interface. Based on the user preferences, a determination is made as to which of the media programs to transcode for playing on the second device. Those media programs are transcoded prior to the second device being available for transferring the media programs. When the second device is available, one or more of the transcoded programs are selected for transfer to the second device based on the user preferences, and the selected transcoded programs are transferred to the second device. At a later point in time, playback status is received at the first device from the second device. The playback status describes what portions of the selected transcoded programs were played on the second device.

Still another aspect is a computer system for managing digital media. The system comprises a user interface, computer readable storage having instructions stored therein, and a processor coupled to the computer readable storage and the user interface. The instructions cause the processor to implement: a tuning module that captures broadcast media programs; a management module that receives user requests to record media programs captured by the tuning module and user preferences with respect to transferring recorded programs to a target device; a transcoder module that transcodes media programs from a first format to a second format that is suitable for the target device; and a synchronization module that transfers transcoded media programs to the target device. The management module selects to transcode, based on the user preferences, a set of the media programs that the user requests to be recorded. The management module instructs the transcoder module to transcode the selected set of media programs in advance of the target device being available for transfer. The management module determines, based on the user preferences, which of the transcoded programs to transfer to the target device when the target device is available for transfer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Architectural Overview

Figure 1:
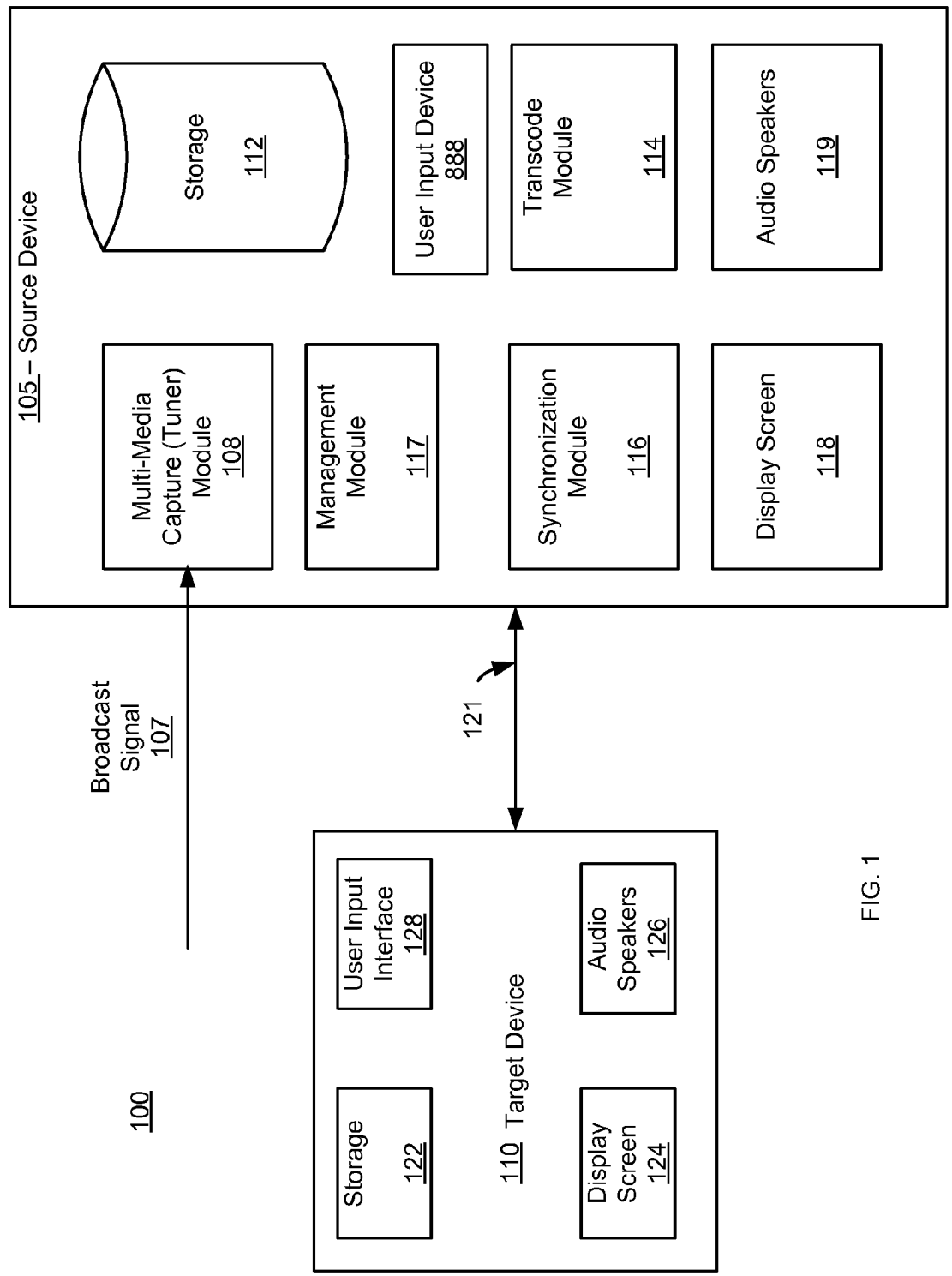
FIG. 1 illustrates an exemplary system having a source device and an exemplary target device in which various embodiments described herein can be implemented.

FIG. 1 illustrates an exemplary system 100 having a source device 105 and a target device 110 in which various embodiments described herein can be implemented. In one embodiment, the source device 105 functions as a personal video recorder (PVR) that receives a broadcast signal 107 containing media (e.g., television programs, movies, etc.). The broadcast signal 107 can be either analog or digital. If the broadcast signal 107 is analog, the source device 105 converts the broadcast signal 107 to digital. Thus, regardless of the format of the signal 107, the source device 105 has digital media to work with. The source device 105 records the digital media on the storage medium 112, automatically transcodes the digital media such that it is suitable to play on the target device 110 (e.g., digital media player), and transfers the transcoded digital media to the target device 110 when the target device 110 has a communication connection to the source device 105. The user can then take the target device 110 with them and play the digital media that was previously recorded on the source device 105. The user can also play the digital media that was recorded on the source device 105.

As an example, a user records television programs on the source device 105 and specifies preferences for transferring recorded programs to the target device 110. Embodiments disclosed herein facilitate the transfer process by determining which programs to automatically transcode prior to the target device 110 being available for transfer. In one embodiment, playing status that describes the portion of the digital media that the user played on the source device 105 and target device 110 is tracked, such that the playing status can be used to determine what digital media to transfer to and remove from the target device 110. In one embodiment, playing status regarding what portions of the programs the user played on the target device 110 is transferred back to the source device 105 to help manage how the programs are played on the source device 105. For example, a "bookmark" is transferred to the source device 105 so that the user can pick up viewing on the source device 105 from where the user left off viewing on the client device 110.

The source device 105 includes at least one multi-media capture module 108 to capture to the broadcast signals 107 to extract the digital media. In one embodiment, the multi-media capture module 108 is a tuner, which refers to component(s) that enable the source device 105 to tune to a particular broadcast channel. The source device 105 can have one or more tuners. As an example, the source device 105 could have one or more analog or digital tuner cards. The source device 105 can also receive Internet Television. Numerous vendors provide software programs for receiving Internet Television. An example of such a software product is the Microsoft® Mediaroom™ Internet Protocol Television (IPTV) software platform, which is commercially available from Microsoft Corporation of Redmond, Wash. The source device 105 can receive broadcast content from a number of sources, including but not limited to, a broadcast antenna, a cable source, a satellite source, and an Internet source.

The source device 105 has a display screen 118 and audio speakers 119 to present the broadcast content (e.g., audio data and video data) that is received by the capture module 108. The display screen 118 and audio speakers 119 can be integrated into the source device 105. However, the display screen 118 and audio speakers 119 could be implemented in a separate component, such as a television or stereo system that receives the digital media from the source device 105. The source device 105 can be coupled to any number of display screens and/or similar devices that can be implemented to display or otherwise render content.

The source device 105 receives electronic program guide (EPG) information from the broadcast signal 107. The EPG data includes station identifiers, channel identifiers, schedule information, program titles, ratings, characters, program descriptions, actor names. An electronic program guide or EPG refers to a particular type of user interface that is presented on, for example, the display screen 118. One type of EPG comprises a grid having multiple rows, each of which is associated with a broadcast channel, and multiple columns each of which can be associated with a time slot.

The source device 105 has a user input interface 888 that allows the user to navigate the EPG to determine schedules of current and future programming, set reminders for upcoming programs, and/or enter instructions to record one or more television programs.

In response to the user's request to record a program, the source device 105 records the program on the storage medium 112. The source device 105 may store the program in the same format as it is received by the capture module 108. Alternatively, the transcode module 114 transcodes the digital media associated with the program to a different format. For example, the transcoder 114 may compress the digital media to reduce storage requirements.

The transcode module 114 also transcodes the digital media so that it is suitable to play on the target device 110. In one embodiment, the transcoding is performed prior the target device 110 being available for transfer. The management module 117 determines, based on user preferences, what programs to transcode in advance of the target device 110 being available.

From time to time, the synchronization module 116 transfers selected programs from the source device 105 to the target device 110 over a communication link 121. In one embodiment, the communication link 121 is a Universal Serial Bus (USB); however, another interface can be used. In one embodiment, the communication link 121 is wireless. Examples of wireless communication links 121 include, but are not limited to, Bluetooth and IEEE 802.11. Media files can be transferred from the source device 105 to the target device 110 by use of a transfer protocol such as "Media Transfer Protocol", which is a well-known protocol for transferring media files.

In one embodiment, the synchronization module 116 automatically transfers selected pre-transcoded digital media from the source device 105 to the target device 110 when the source device 105 has a communication link 121 to the target device. Pre-transcoded means that the digital media was transcoded prior to the source device 105 having a communication link 121 to the target device. Automatically transferring means that whenever a communication link 121 between the two devices 105, 110 is available, a synchronization is initiated. In one embodiment, the transfer is initiated manually by the user. The management logic 117 determines which of the pre-transcoded digital media to transfer, based on the user preferences.

Figure 8:
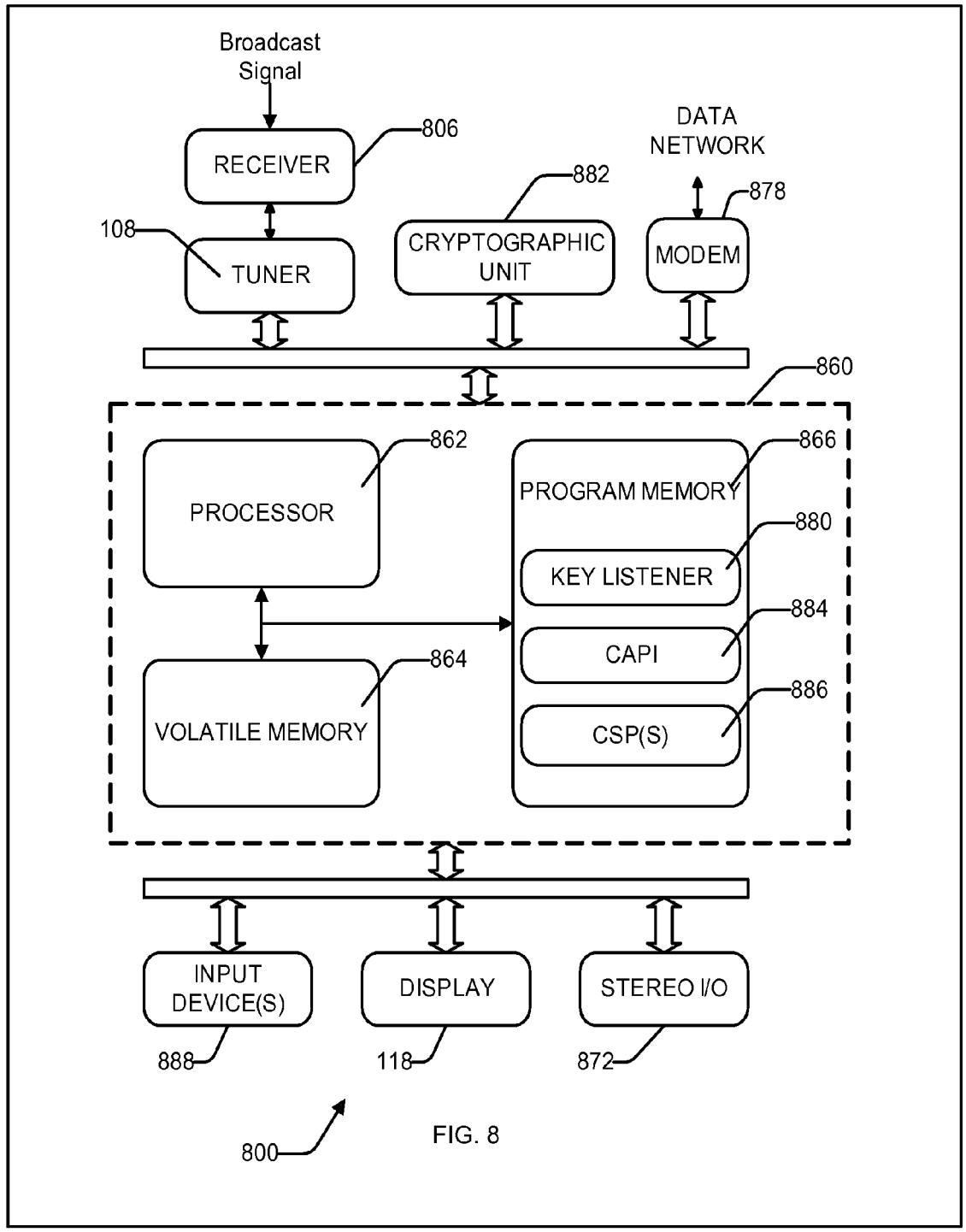
FIG. 8 depicts an example computer system that serves as a platform for embodiments of the present invention.

The source device 105 can be implemented in numerous ways including, but not limited to, a personal computer, a set-top box, or a television set. The source device 105 can include any combination of those devices, or other devices. For example, the source device 105 can be implemented as a set-top box having storage for recording programs and a television set for displaying the programs and EPG. An example platform for implementing the source device 105 is depicted in FIG. 8.

Figure 9:
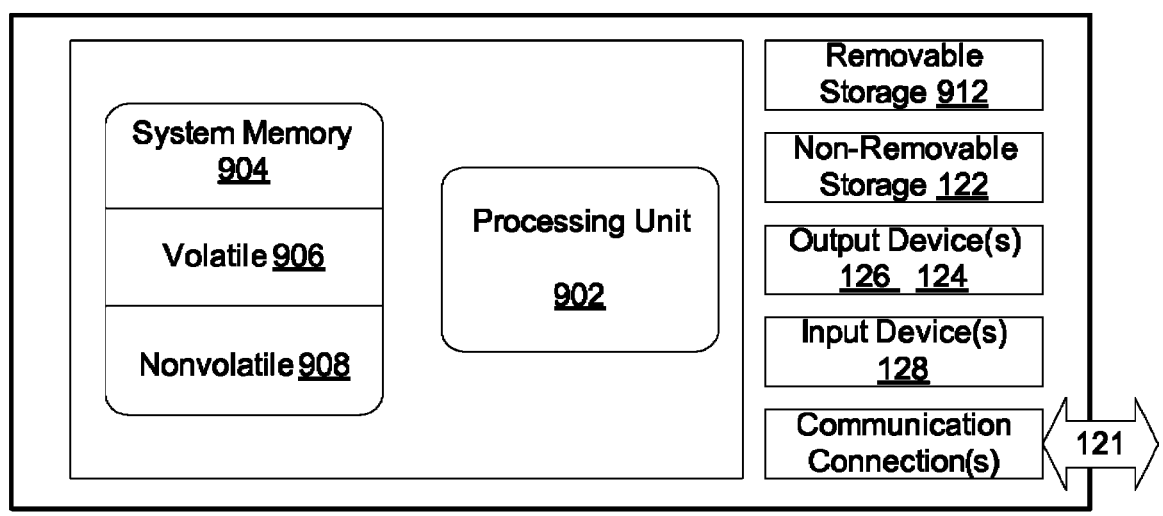
FIG. 9 depicts an example computer system that serves as a platform for embodiments of the present invention.

The target device 110 may be a device whose primary function is to play video and/or audio content. An example of such a device is a digital media player. One example of a digital media player is the Zune™ digital media player, which is commercially available from Microsoft Corporation of Redmond, Wash. Digital media players are sometimes also referred to as portable media players, portable multi-media players, and portable video players. However, the target device 110 could also be a device such as a cellular telephone or personal digital assistant whose primary function is something other than media playback. An example platform for implementing the target device 105 is depicted in FIG. 9.

The target device 110 has a display screen 124 for viewing video as well as pictures (or "still images"). The target device 110 also has audio speakers 126 for playing the audio portion of video files or audio only files. The target device 110 may be used to view videos in formats such as MPEG-4 (Motion Pictures Experts Group) and WMV (Windows Media Video). The target device 110 can also be used to play audio files having formats such as MP3 (MPEG-1 Audio Layer 3), WMA (Windows Media Audio), waveform audio format (WAV), and advance audio coding (AAC). The target device 110 may also be used a picture viewer displaying still images in a format such a JPEG (Joint Photographic Experts Group), GIF (Graphics Interchange Format), PNG (Portable Networks Graphics), or TIFF (Tagged Image File Format).

The target device 110 includes storage 122 for storing the transcoded digital media from the source device 105. Examples of the storage 122 include, but are not limited to hard drives, microdrives, and solid state memory devices such as flash memory. Note that the target device 110 may have substantially less storage space than the source device 105.

The target device 110 has a user interface 128 that allows the user to navigate through menus, etc. in order to select which media to play. As an example, the user interface may be what is referred to as a "wheel and touch" mechanism.

In one embodiment, to implement the various modules (114, 116, 108, 117) on the source, the source device 105 executes computer readable instructions that are stored on computer readable media. The source device 105 has a processor (e.g., FIG. 8, 862) on which the instructions are executed. In one embodiment, the target device 110 also has a processor on which computer readable instructions are executed.

Computer readable media can be any available media that can be accessed by the source device 105 or target device 110. By way of example, and not limitation, computer readable media may comprise computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the computer readable instructions and which can accessed by the source device 105 or target device 110.

It is to be appreciated and understood that the exemplary system 100 constitutes but one exemplary operating environment. Accordingly, this description is not intended to limit application of the claimed subject matter to just this one type of operating environment. Rather, the inventive principles described herein can be implemented in other similar or different environments without departing from the spirit and scope of the claimed subject matter.

Functional Overview

Figure 2:
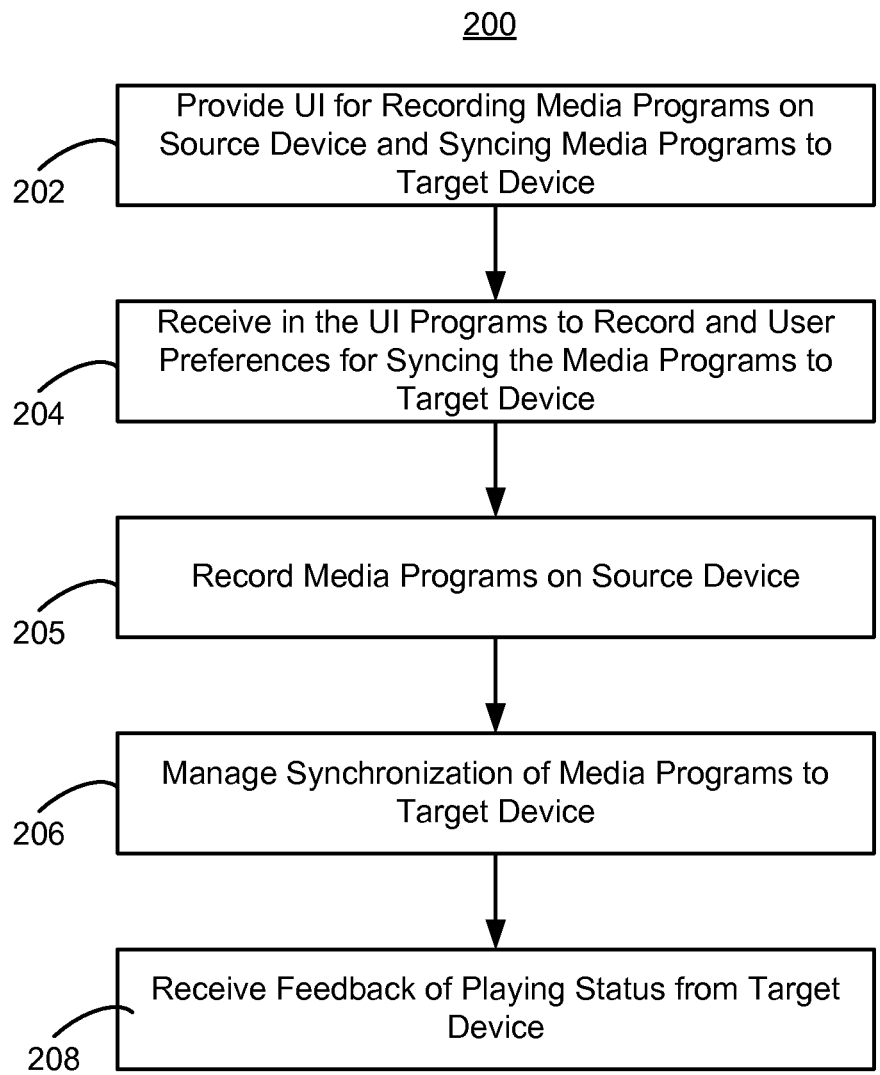
FIG. 2 depicts one embodiment of a process for managing digital media that is played on multiple devices.
Figure 3:
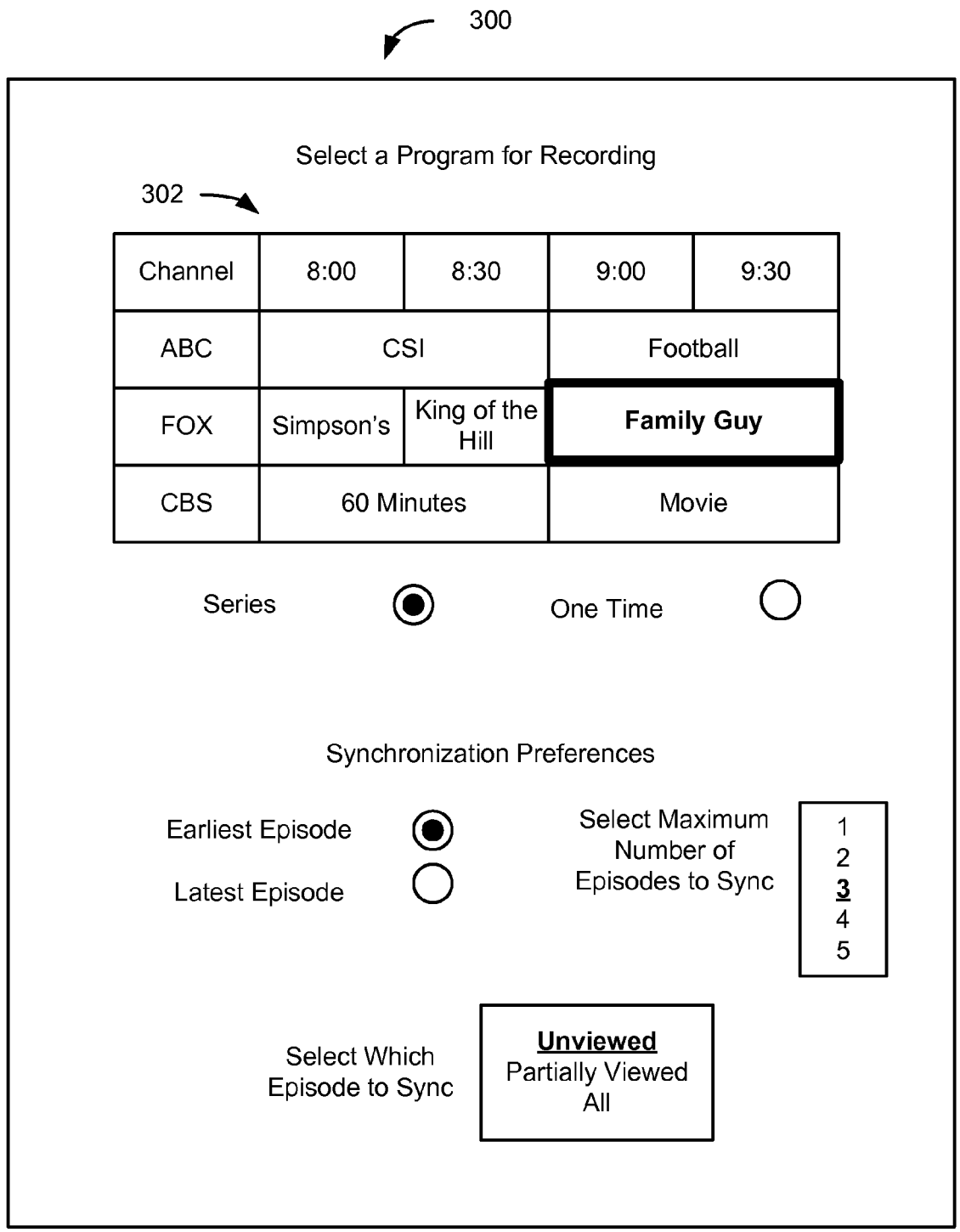
FIG. 3 depicts an exemplary UI that may be displayed on the source device.

FIG. 2 depicts one embodiment of a process 200 for managing digital media that is played on multiple devices. In one embodiment, the process 200 is performed on a source device 105 such as the exemplary source device 105 in FIG. 1. However, one or more steps (or portions of steps) of process 200 may be performed on the target device 110. Process 200 may be implemented by either hardware or software, or a combination of hardware and software. In step 202, a user interface (UI) is provided for recording programs on the source device 105 and inputting user preferences for synchronizing the recorded programs to the target device 110. FIG. 3 depicts an exemplary UI 300 that may be displayed on the source device 105. The exemplary UI 300 depicts a program schedule grid of an EPG 302. The user can schedule a program for recording by selecting one of the boxes in the EPG 302. In another embodiment, the user does not select a box in an EPG 302. Instead, the user selects a program for recording by entering a channel number, date and time.

In step 204, the source device 105 receives parameters through the UI 300 for recording programs, as well as user preferences for synchronizing the recorded programs to the target device 110. In the example UI 300, the user has selected to record the program "Family Guy," which is to be broadcast by FOX at 9:00 pm. The user has also specified that the series is to be recorded by selecting the "series" radio button, which means that every time a new episode of "Family Guy" is broadcast on FOX that the source device 105 should record that program. There could be many options for recording a series. For example, the user could request that the series be recorded if it is broadcast on a channel other than FOX. The user might also make recording requests based on whether the broadcast is a new episode or a re-run. As another example, the user could specify that just this episode is to be recorded by selecting the "one-time" radio button.

The UI 300 also allows the user to enter synchronization preferences (which are also referred to herein as "user preferences"). In the example UI 300, the user is allowed to specify whether the earliest recordings or the latest recordings of the program to be recorded should be transferred to the target device 110 when the target device 110 is available. Earliest and latest can be in terms of when the episodes are recorded or the original airdate of the episodes. The example UI 300 does not provide the user with the option to choose between the original airdate and record date. Rather, that determination is made by the management module 117. However, a UI could provide the user with the option to choose between the original airdate and the record date.

The user also inputs the maximum number of episodes of this particular program that are to be transferred to the target device 110 during any particular synchronization. Note that the user might set up a second recording of the same program by, for example, establishing a recording for the episodes that are broadcast on a different channel. In one embodiment, the user is allowed to select a different maximum number of episodes for the two recordings. Alternatively, all episodes of the program can be treated the same, regardless of which channel the recording is made from. In the latter case, if the source device 105 recorded four episodes broadcast on FOX and seven episodes broadcast on TBS, only three total episodes would be transferred.

Finally, the user specifies whether unviewed, partially viewed, or all episodes of this program to be recorded should be transferred to the target device 110. The UI 300 could allow the user to input other synchronization preferences.

Also note that some user preferences could be determined implicitly. For example, the management module 117 can track user viewing history to determine which television series that the user prefers. The viewing history can include both those media programs that were recorded and those played live. In one embodiment, the management module 117 receives status from the target device 110 regarding what media programs that the user played on the target client 110. This status from the target device 110 can be used to determine implicit user preferences. The management module 117 can also determine implicit user preferences based on what series that the user records.

Figure 4:
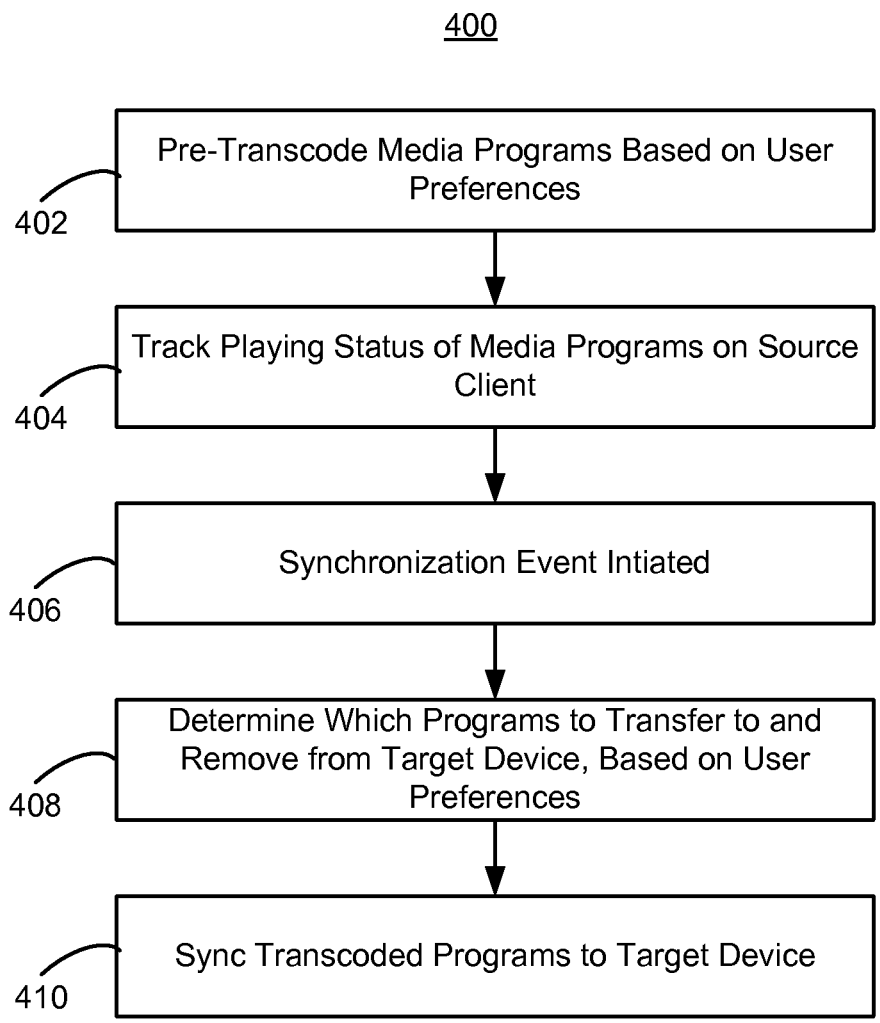
FIG. 4 depicts one embodiment of a process of managing synchronization of media programs on multiple devices.

In step 205, the media programs that the user requested to be recorded are recorded on the source device 105. In step 206, synchronization of media programs to the target device 110 is managed based on the user preferences. Managing the synchronization may include pre-transcoding media programs so that they are ready for transfer when the target device 110 is available, tracking what portions of the recorded programs the user played on the source device 105, and determining what pre-transcoded programs to transfer to the target device 110 based on the tracking information and the user preferences. Process 400 of FIG. 4 provides details of one embodiment of step 206.

Step 208 is the source device 105 receiving feedback regarding the playing status of the transcoded programs that were transferred to the target device 110. In one embodiment, the target device 110 tracks what portions of the media programs the user played on the target device 110 and transfers that playing status to the source device 105 during synchronization. In one embodiment, the playing status includes "bookmarks" that specify a position in a media program. Typically, this position is the location at which the user stopped playing the media program, but other locations can also be specified by bookmarks.

These bookmarks are stored on the source device 105 such that the user can pick up viewing a program on the source device 105 where the user left viewing that program on the target device 110. In one embodiment, bookmarks are transferred from the source device 105 to the target device 110 during synchronization. For example, when transferring a partially watched media program to target device 110, a bookmark is provided so that the user can pick up viewing the program where they left off.

Managing Synchronization of Media Programs

FIG. 4 depicts one embodiment of a process 400 of managing synchronization of media programs. Process 400 may be used to implement step 206 of process 200. In step 402, programs are transcoded in advance of when the target device 110 is available for transferring the programs ("pre-transcoding"). In step 402, a determination is made as to which of the programs that the user requested be recorded should be pre-transcoded. The determination is based on the user preferences. Process 500 of FIG. 5A and process 550 of FIG. 5B depicts two embodiments for automatically pre-transcoding programs based on user preferences.

In step 404, the playing status of the programs recorded on the source device 105 is tracked. By tracking the playing status it is meant that source device 105 keeps track of which portions of each media program was played on the source device 105. In one embodiment, the source device 105 records whether each program is "unplayed," "partially played," or "completely played."

In step 406, a synchronization event is initiated. In one embodiment, the synchronization event is automatically initiated upon the target device 110 being available for synchronization through either a wireless or a wired connection 121. In one embedment, the synchronization event is manually triggered by the user.

Figure 7:
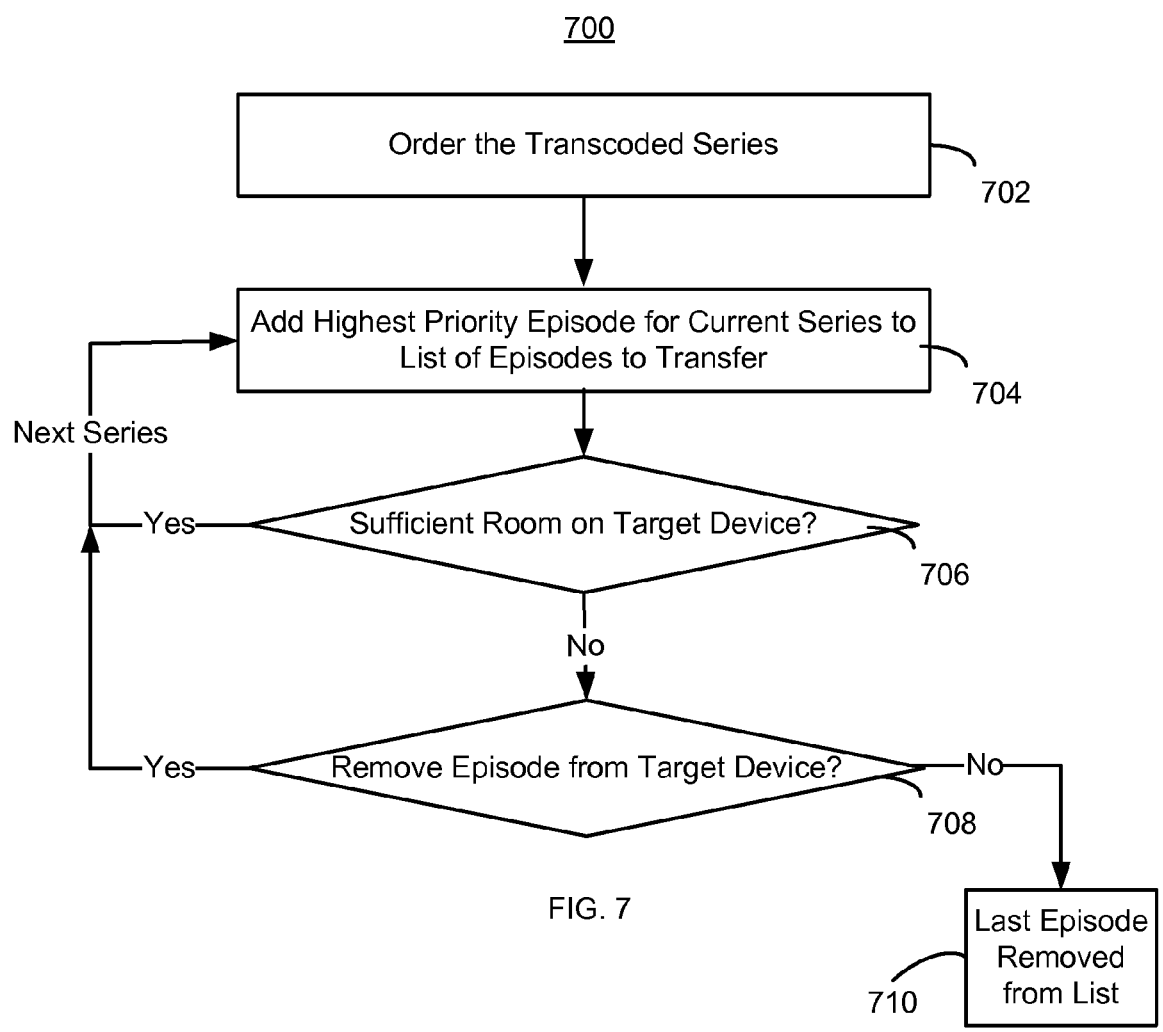
FIG. 7 depicts one embodiment of a process for determining which pre-transcoded programs to transfer to the target device.

In step 408, a determination is made as to which of the pre-transcoded programs to transfer to the target device 110. Moreover, a determination is made as to which programs, if any, to remove from the target device 110 to make room for new media programs. The decision as to which files to transfer and to remove is based on the user preferences. Process 700 of FIG. 7 depicts one embodiment of a process for implementing step 408.

In step 410, the media programs determined by step 408 are transferred to the target device 110 by, for example, the synchronization module 116.

Pre-Transcoding at Time of Recording

Figure 5A:
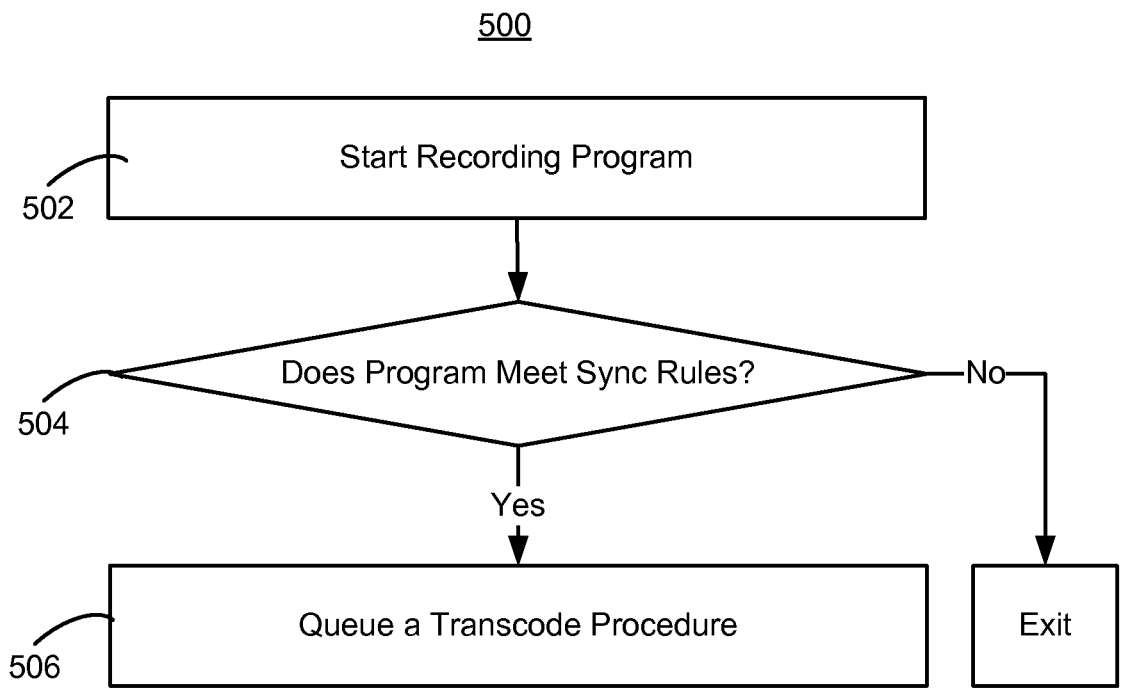
FIG. 5A and FIG. 5B depict embodiments for pre-transcoding media programs.
Figure 5B:
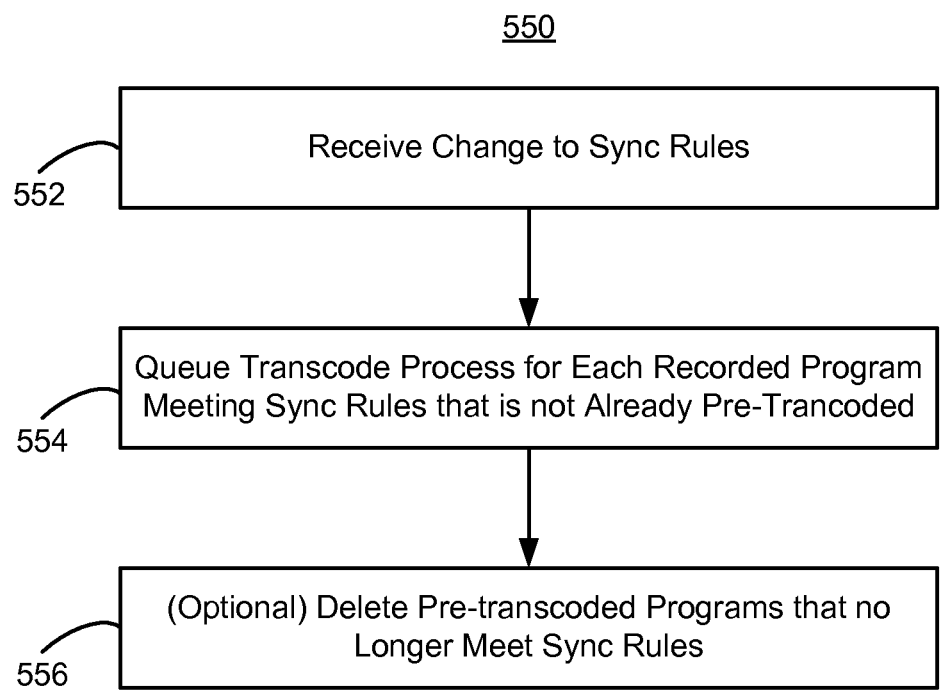

Process 500 of FIG. 5A depict one embodiment for implementing step 402 of process 400. Process 500 is performed each time a recording starts. Thus, process 500 is performed multiple times in the implementation of step 402. In step 502, recording of a media program begins on the source device 105.

In step 504, a determination is made as to whether the media program should be pre-transcoded for playing on the target device 110. The determination is based on the user preferences that were received, for example, in step 204 of process 200. Another consideration is the amount of storage that is available on the target device 110.

Consider the following example to illustrate the determination of step 504. The recording to be made is an episode of the program "Family Guy." The user prefers to have the latest episodes transferred, wherein latest is in terms of the original broadcast date. The source device 105 has already pre-transcoded three episodes of this program. In this example, the user prefers to only transfer three episodes per synchronization. Therefore, as the limit has been reached, a determination is made as to whether this episode has a "higher priority" than the already pre-transcoded episodes. Priority may be determined based on the original airdate. For example, if the episode to be recorded had an original airdate that is later than one of the three already pre-transcoded episodes, then it is transcoded and replaces that episode. However, another technique could be used to determine priority.

If the program to be recorded is to be transcoded, then a transcode procedure is queued in step 506. The transcode procedure may take place while the recording is being made or afterwards. In some cases, the transcoding is performed while the recording is being made. However, this may not always be possible. If the transcoding is to be made after the recording is made, the transcoding can be performed at a time (or times) when processor utilization is relatively low.

Pre-Transcoding Upon Change of User Preferences

From time to time, the user may change preferences with respect to what digital media is to be transferred to the target device 110. FIG. 5B depicts one embodiment of a process 550 of automatically pre-transcoding in response to a change of user preferences (or synchronization rules). In step 552, a change to the user preferences is received. For example, the user may decide to change how many episodes of a given program that should be transferred to the target device 110. Alternatively, the user may have previously specified that only unviewed episodes are to be transferred, but that now the user specifies that partially viewed episodes should also transferred.

Figure 6:
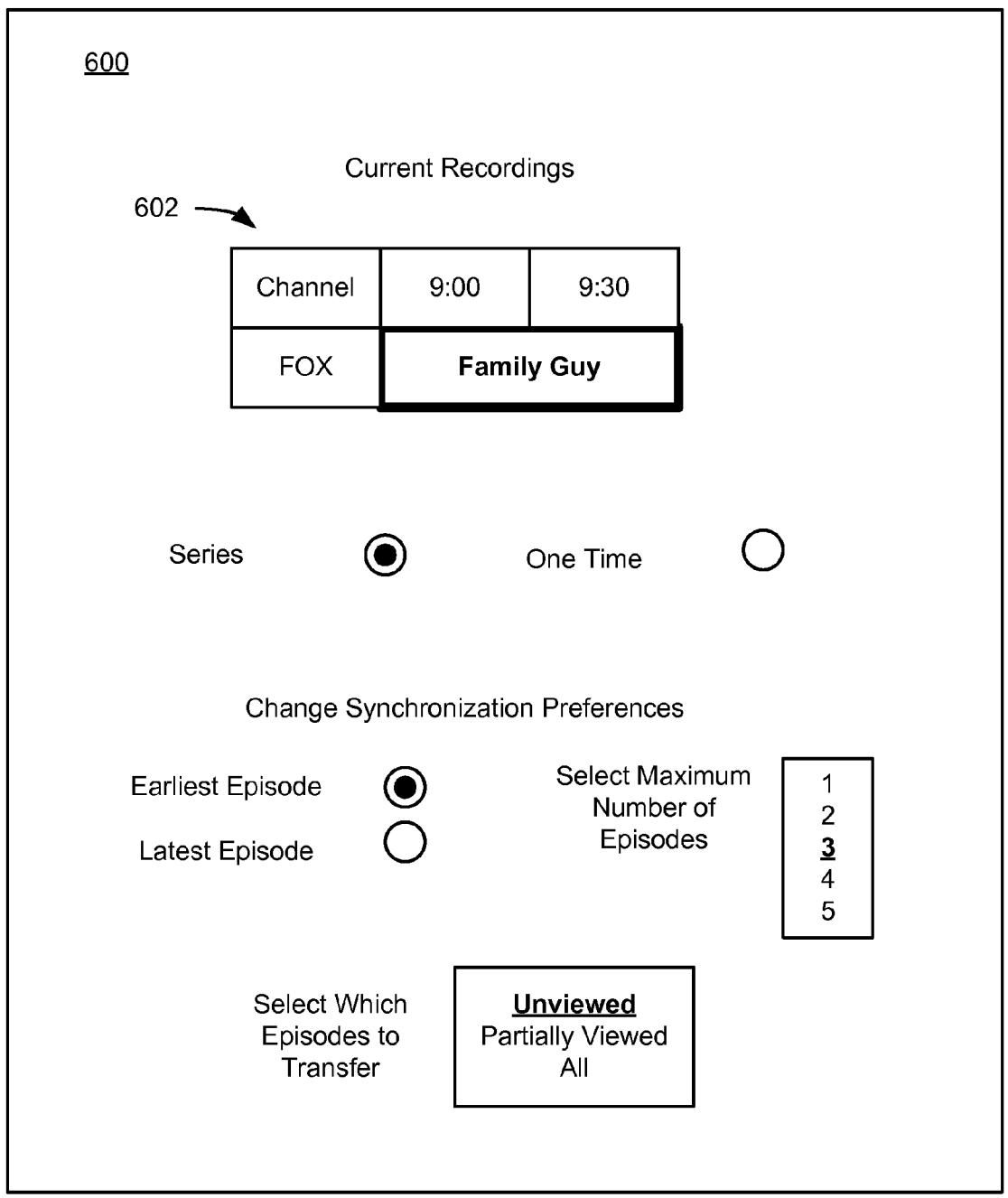
FIG. 6 depicts an example UI that allows a user to change their preferences for the user's recordings.

FIG. 6 depicts an example UI 600 that allows a user to change their preferences for the user's recordings. The example UI 600 displays the user's current recordings 602 and preference of series versus one time recording. The example UI 600 displays the user's current synchronization preferences, which can be changed by the user.

In step 554, a transcode is queued for each already recorded media program that satisfies the new user preferences and has not already been pre-transcoded. By queuing a transcode for a particular media program it is meant that the management module 117 adds the particular media program to be transcoded to a "queue" of programs to be transcoded. The queue is processed by the transcode module 114. However, it is not required that a queue be maintained.

In optional step 556, for each already transcoded media program that now fails to satisfy the new user preferences, the transcoded media program may be deleted from the source device 105 to free space on the source device.

Determining Which Pre-Transcoded Programs to Transfer to Target Device

FIG. 7 depicts one embodiment of a process 700 for determining which pre-transcoded programs to transfer to the target device 110. Process 700 is one technique for implementing step 408 of process 400. Assume that episodes from multiple series have been pre-transcoded, but that not all of the pre-transcoded episodes will be transferred to the target device 110. In step 702, a series order is developed for the different series that have been pre-transcoded. The priority may be based on user preferences. The user preferences may be explicitly provided by the user or implicitly determined. In one embodiment, the management module 117 causes a UI to be displayed on the display screen 118 to allow the user to input explicit series preferences. In one embodiment, the management module 118 determines the series preferences based on user viewing history on the source device 105 and/or the target device 110. An example of implicitly determining the series priority is to track which series that the user prefers to record. Another example is to track which series the user plays on the source device 105 and/or the target device 110.

Once the series priority has been determined, one episode from each series is added to a list of media programs in round robin fashion. In step 704, one episode is selected from the highest priority series. Typically, the highest priority episode from the series is selected. As previously discussed, priority may be based on when the episode was originally broadcast. Alternatively, the priority may be based on when the episode was recorded. Priority may also be based on viewing status. For example, a user may prefer unviewed episodes over partially viewed episode, although both should be transferred if other conditions permit.

In step 706, a determination is made as to whether the target device 110 has sufficient storage for another media program. If so, control passes to step 702 to select an episode from the series with the next highest priority. Once one program has been selected from each series, then a second program is selected from the highest priority series. In this way, the user gets the highest priority episodes transferred to the target device 110 and a breadth of available shows.

At some point the target device 110 may have insufficient room for storing the last episode added to the list (step 706). If this occurs, then control passes to step 708 to determine whether any previously transferred episodes can be removed from the target device 110 to make room. In one embodiment, the user is prompted with a choice to select which episodes, if any, should be removed from the target device 110. In one embodiment, when the user set up user preferences in step 204 of process 200, the user explicitly specifies conditions upon which a media program can be removed. For example, the user specifies that episodes from a particular series may never be deleted without explicit user permission or, alternatively, that those episodes may be deleted to make room for newer episodes from that series. The conditions for deleting a program may be based on any of the user preferences.

The deletion determination may be based in part on the playing status of the media programs on the target device 110, which may be used in conjunction with the user preferences. For example, the user may have specified that a partially viewed episode may/may not be deleted. In addition, a comparison may be made of the playing status of episodes on the target device 110 with the playing status of episodes on the source device 105. For example, unviewed episodes on the source device 105 might be assigned a higher priority than partially viewed episodes on the target device 110. However, partially viewed episodes on the source device 105 might be assigned a lower priority than partially viewed episodes on the target device 110. Many other rules may be developed for assigning priorities between episodes on the source device 105 and target device 110.

If enough episodes can be deleted from the target device 110 to provide room for the episode for which previously there was insufficient room, then control passes to step 704 to add another episode to the list of episodes to transfer. If not enough episodes can be deleted to make room, then control passes to step 710 to remove the last episode from the list.

It is not required that the determination of which episodes to transfer is based on a round robin priority based on series priority. In one embodiment, the different series all have the same priority. Also, a given media program might not be part of a series of multiple episodes (in which case it can be considered to be a series containing a single media program, if desired).

Exemplary Source Device

At least some of the embodiments disclosed herein may be implemented on a media device that a user interacts with when viewing media content. FIG. 8 shows an example configuration of a broadcast-enabled electronic media device 800 having user input device(s) 888 allowing user interaction with media content. In one embodiment, the device 800 serves as a platform for the source device 105. Device 800 includes a central processing unit 860 having a processor 862, volatile memory 864 (e.g., RAM), and program memory 866 (e.g., ROM, Flash, disk drive, floppy disk drive, CD-ROM, etc.). The device 800 has one or more input devices 888 (e.g., keyboard, mouse, etc.), a video display 118 (e.g., VGA, SVGA), and a stereo I/O 872 for interfacing with a stereo system.

The device 800 includes a digital broadcast receiver 806 (e.g., satellite dish receiver, RF receiver, microwave receiver, multicast listener, etc.) and one or more tuners 108 which tune to appropriate frequencies or addresses of the broadcast network. The tuner(s) 108 could be configured to receive either analog or digital data. For example, a tuner 108 may be configured to receive digital broadcast data in a particularized format, such as MPEG-encoded digital video and audio data, as well as digital data in many different forms, including software programs and programming information in the form of data files. A tuner 108 might also be configured to receive analog data and convert the analog data to digital. Alternatively, an analog tuner may output analog data, which is converted to digital data by the processor 862. The device 800 also has a modem 878, which provides dial-up access to the data network 828 to provide a back channel or direct link to a server. In other implementations of a back channel, the modem 878 might be replaced by a network card, or an RF receiver, or other type of port/receiver that provides access to the back channel.

The device 800 runs an operating system that supports multiple applications. The operating system may be a multitasking operating system that allows simultaneous execution of multiple applications. The operating system may employ a graphical user interface windowing environment that presents the applications or documents in specially delineated areas of the display screen called "windows."

The device is illustrated with a key listener 880 to receive the authorization and session keys transmitted from a server. The keys received by listener 880 are used by the cryptographic security services implemented at the device 800 to enable decryption of the session keys and data. Cryptographic services are implemented through a combination of hardware and software. A secure, tamper-resistant hardware unit 882 is provided external to the CPU 860 and two software layers 884, 886 executing on the processor 862 are used to facilitate access to the resources on the cryptographic hardware 882.

The software layers include a cryptographic application program interface (CAPI) 884 that provides functionality to any application seeking cryptographic services (e.g., encryption, decryption, signing, or verification). One or more cryptographic service providers (CSPS) 886 implement the functionality presented by the CAPI to the application. The CAPI layer 884 selects the appropriate CSP for performing the requested cryptographic function. The CSPs 886 perform various cryptographic functions such as encryption key management, encryption/decryption services, hashing routines, digital signing, and authentication tasks in conjunction with the cryptographic unit 882. A different CSP might be configured to handle specific functions, such as encryption, decryption, signing, etc., although a single CSP can be implemented to handle them all. The CSPs 866 can be implemented as dynamic linked libraries (DLLs) that are loaded on demand by the CAPI, and which can then be called by an application through the CAPI 884.

Exemplary Target Device

FIG. 9 depicts an example computer system 900 that may serve as a platform for embodiments of the present invention. The target device 110 may be implemented with such a computer platform. In its most basic configuration, the computer 900 typically includes a processing unit 902 and memory 904. Depending on the exact configuration and type of computing device, memory 904 may be volatile (such as RAM), non-volatile (such as ROM, flash memory, etc.) or some combination of the two. Additionally, computer 900 may also have mass storage (removable 912 and/or non-removable 914) such as compact flash cards. Similarly, computer 900 may also have input devices 128 such as a "wheel and touch" mechanism. The computer 900 also has output devices such as audio speakers 124 and display 122. Other aspects of device 900 may include communication connections 121 to other devices using either wired or wireless media. For example, the source device 105 and the target device have a connection 121, such as USB or IEEE 802.11 for transferring digital media. The computer 900 may also have a communication connection to another device such as an Internet server or cellular communication tower.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A machine implemented method comprising:
providing a user interface for scheduling recording of digital media on a first device and for inputting synchronization rules that define which digital media that were requested to be recorded on the first device should be synchronized from the first device to a second device, the user interface simultaneously displays a selection of digital media for recording on the first device and a selection of a portion of the digital media that was selected for recording on the first device for synchronization to the second device;
receiving, via the user interface, a user request to schedule recording of digital media on the first device;
receiving, via the user interface, synchronization rules for synchronizing digital media that a user requested to be recorded on the first device from the first device to the second device;
recording, on the first device, the digital media that the user requested to be recorded on the first device;
determining whether to pre-transcode digital media that was requested to be recorded on the first device based on the synchronization rules for synchronizing digital media, including determining whether the digital media meets the synchronization rules;
automatically pre-transcoding the digital media that meets the synchronization rules on the first device so that it is suitable to present on the second device, the pre-transcoding is performed prior to the second device being available for synchronization; and
synchronizing at least some of the pre-transcoded digital media from the first device to the second device.

2. The method of claim 1, further comprising:
receiving information from the second device that indicates a portion of the recorded digital media that was played on the second device.

3. The method of claim 2, further comprising:
playing digital media on the first device based on the information that indicates what portion of the recorded digital media was played on the second device.

4. The method of claim 1, wherein the synchronizing at least some of the pre-transcoded digital media from the first device to the second device includes:

selecting at least a portion of the pre-transcoded digital media to transfer to the second device based on what portions of the recorded digital media the user has viewed on the first device.

5. The method of claim 4, further comprising:
removing digital media from the second device based on the synchronization rules input via the user interface.

6. The method of claim 1, further comprising:
receiving a change to the synchronization rules, the determining which portions of the recorded digital media to pre-transcode is performed in response to receiving the change in synchronization rules.

7. A computer storage device having stored thereon instructions, which when executed on a processor, cause the processor to:
provide a user interface for scheduling recording of media programs on a personal video recorder and for inputting synchronization rules for synchronizing media programs that were requested to be recorded on the personal video recorder to a portable media player, the user interface simultaneously displays a selection of digital media for recording on the personal video recorder and a selection of a portion of the digital media that was selected for recording on the personal video recorder for synchronization to the portable media player;
receive, in the user interface, scheduling requests to record media programs on the personal video recorder and synchronization rules for determining which of the media programs to synchronize from the personal video recorder to the portable media player;
record the scheduled media programs on the personal video recorder;
determine which of the media programs that were requested to be recorded on the personal video recorder to pre-transcode on the personal video recorder for playing on the portable media player, the determining which of the media programs to pre-transcode includes determining which of the media programs requested to be recorded meet the synchronization rules that were received in the user interface;
pre-transcode the media programs that meet the synchronization rules to form transcoded programs suitable to play on the portable media player, the pre-transcoding is performed on the personal video recorder at a time when the portable media player does not have a communication link to the personal video recorder for transferring media programs;
select one or more of the pre-transcoded programs for transfer to the portable media player based on the synchronization rules;
synchronize the selected pre-transcoded programs from the personal video recorder to the portable media player via the communication link; and
receive status at the personal video recorder from the portable media player, the status describes what portions of the selected pre-transcoded programs were played on the portable media player.

8. The method of claim 1, wherein the pre-transcoding is performed while the digital media that meets the synchronization rules is being recorded on the first device.

9. The computer storage device of claim 7, wherein the instructions further cause the processor to:
track what portions of the pre-transcoded programs were played on the personal video recorder; and wherein the selecting one or more of the pre-transcoded programs is further based on what portions of the pre-transcoded programs were played on the personal video recorder.

10. The computer storage device of claim 7, wherein the instructions further cause the processor to:
determine which media programs that were previously synchronized to the portable media player should be removed from the portable media player to allow transfer of the selected pre-transcoded programs by selecting which programs of the pre-transcoded programs and the media programs that were previously synchronized to the portable media player are preferred by a user based on the synchronization rules.

11. The computer storage device of claim 7, wherein the instructions, which when executed on a processor, cause the processor to receive status at the personal video recorder from the portable media player cause the processor to:
receive a bookmark that defines where a user stopped playing a first pre-transcoded program of the pre-transcoded programs that were transferred to the portable media player.

12. The computer storage device of claim 7, wherein the instructions further cause the processor to:
receive a selection that is based on the status from the portable media player; and
play a first of the media programs on the personal video recorder based on the selection that is based on the status.

13. The computer storage device of claim 7, wherein the instructions further cause the processor to:
determine implicit synchronization rules for transferring media programs from the personal video recorder to the portable media player based on user viewing behavior; and
wherein the processor selects one or more of the pre-transcoded programs for transfer to the portable media player is further based on the implicit synchronization rules.

14. The computer storage device of claim 13, wherein the instructions that cause the processor to determine implicit synchronization rules include instructions that cause the processor to:
determine the implicit synchronization rules based on the status received at the personal video recorder.

15. A computer system for managing digital media, wherein the system comprises:
a display screen;
computer readable storage having instructions stored therein; and
a processor coupled to the computer readable storage and to the display screen, the instructions cause the processor to implement:
a tuning module that captures broadcast media programs;
a management module that provides a single user interface on the display screen that allows both scheduling recordings of the captured broadcast media programs on the computer readable storage and inputting synchronization rules for synchronizing recorded media programs to a portable media player, the single user interface simultaneously displays a selection of broadcast media programs for recording on the computer readable storage and a selection of which episodes of a broadcast media program that was selected for recording on the computer readable storage for synchronization to the portable media player;

the user interface receives a request to schedule recordings of media programs and receives synchronization rules for synchronizing media programs that were requested to be recorded from the computer system to the portable media player;

a transcoder module that transcodes media programs on the computer system from a first format to a second format that is suitable for the portable media player;

a synchronization module that synchronizes transcoded media programs from the computer system to the portable media player;

wherein the management module:

determines to pre-transcode media programs at a time when the media programs are recorded on the computer readable storage, media programs that meet the synchronization rules are pre-transcoded, media programs that do not meet the synchronization rules are not pre-transcoded;

instructs the transcoder module to pre-transcode the determined media programs on the computer system to a format suitable for the portable media player in advance of the portable media player being available for transfer; and determines which of the pre-transcoded programs to synchronize from the computer system to the portable media player when the portable media player is available for synchronization, the pre-transcoded programs to synchronize are determined based on the synchronization rules received in the user interface.

16. The system of claim 15, wherein the management module selects media programs to pre-transcode based on whether a user has viewed the media programs on the computer system.

17. The system of claim 15, wherein the management module determines which media programs to remove from the portable media player based on the synchronization rules.

18. The system of claim 15, wherein the management module receives information from the portable media player that indicates what portions of the media programs were played on the portable media player.

19. The system of claim 15, wherein the management module:

receives a change to the synchronization rules; and instructs the transcoder module to pre-transcode media programs that have already been recorded but have not yet been pre-transcoded and that the changed synchronization rules indicate should be synchronized.

20. The system of claim 15, wherein the management module tracks whether the recorded programs were viewed and determines which of the media programs to transfer based, at least in part, on whether the programs were unviewed, viewed, or partially viewed.

* * * * *